(12) United States Patent
Drovdahl et al.

(10) Patent No.: US 8,223,945 B2
(45) Date of Patent: Jul. 17, 2012

(54) COMMUNICATION ACCEPTANCE TIME EXTENDER

(75) Inventors: Mark R. Drovdahl, Seattle, WA (US); Cynthia C. Bevan, Redmond, WA (US); Jasdeep S. Chugh, Renton, WA (US); Amanjot Singh, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 584 days.

(21) Appl. No.: 12/483,894

(22) Filed: Jun. 12, 2009

(65) Prior Publication Data

US 2010/0316209 A1   Dec. 16, 2010

(51) Int. Cl.
*H04M 3/42* (2006.01)
(52) U.S. Cl. ..................................... 379/207.1; 455/416
(58) Field of Classification Search .................. 455/416, 455/550.1; 379/88.19, 207.1, 207.13
See application file for complete search history.

(56) References Cited

U.S. PATENT DOCUMENTS

| 6,978,164 | B2 | 12/2005 | Vicendese |
| 7,324,812 | B2* | 1/2008 | Wegman ........................ 455/416 |
| 2002/0085698 | A1 | 7/2002 | Liebenow |
| 2006/0211443 | A1* | 9/2006 | Wegman ..................... 455/550.1 |
| 2010/0023890 | A1* | 1/2010 | Paalasmaa et al. ........... 715/826 |
| 2010/0062812 | A1* | 3/2010 | Orr .................................. 455/567 |
| 2012/0023509 | A1* | 1/2012 | Blumenberg ................. 719/329 |

* cited by examiner

*Primary Examiner* — Creighton Smith (57) ABSTRACT

A communication system allows a receiving party to request additional time to accept a communication. A telecommunications device of a receiving party detects when the receiving party has indicated a desire for an extended period of time in which to accept an incoming communication. A message is sent to a network communications processor that indicates the receiving party has requested additional time to accept. The network communications processor then processes the communication by resetting or extending a communications availability period associated with the incoming communication.

33 Claims, 6 Drawing Sheets

COMMUNICATION ACCEPTANCE TIME EXTENDER

BACKGROUND

With most telecommunication systems, voice calls placed to a receiving party are only available for acceptance for a preset/default period of time during which the receiving party can accept or answer the call. For most users, an unaccepted call is routed by a communications processor, such as a network switch, to a voicemail system where the originating party can leave a voicemail message for the receiving party. In other embodiments, the network communications processor may inform the originating party that the receiving party is unavailable and end the call.

In many instances, a receiving party desires to accept a call but cannot do so within the preset/default time period because he or she is momentarily occupied with other business. For example, the receiving party may be driving an automobile and unable to accept an incoming communication without first pulling to the side of the road or into a rest area. Alternatively, the receiving party may be in a supermarket checkout line and unable to accept an incoming communication because he or she is dealing with checkout transactions. In other instances, the receiving party's telecommunications device may be inaccessible, such as at the bottom of a handbag or in a deep pocket such that the receiving party cannot retrieve the telecommunication devices quickly enough to accept the incoming communication (e.g., a voice call). In other situations, the receiving party may be engaged in a communication with a third party when he or she receives another incoming communication. In many instances, the receiving party may be able to swap the then-current communication to "hold" status and accept the incoming communication. In other instances, however, the receiving party may not enjoy such call waiting service, or may otherwise not want to interrupt the then-current communication in order to accept the incoming communication. In such cases, the missed call is typically routed to voicemail. It is common, however, that the receiving party immediately attempts to return the communication at the same instant that the originating party is in the process of leaving a voicemail for the receiving party. The receiving party will then have the option of leaving his or her own voicemail message for the originating party, thereby delaying the time when a call between the calling and receiving party can be connected.

The need exists for a system that overcomes the above problems, as well as one that provides additional benefits. For example, to resolve the above problems, there is a need for a method and system to provide a receiving party with additional time to answer incoming communications. Overall, the examples herein of some prior or related systems and their associated limitations are intended to be illustrative and not exclusive. Other limitations of existing or prior systems will become apparent to those of skill in the art upon reading the following Detailed Description

DETAILED DESCRIPTION

As indicated above, the technology disclosed herein relates to a system for allowing a user to selectively increase or extend a period of time in which to accept an incoming communication. An incoming communication may be any type of synchronous communication that is presented or made available to, and requires acceptance by, a receiving party, such as a voice call, a video call, an instant messaging session, etc. For example, a voice call or a video call is typically accepted by depressing a designated button on a telecommunications device, and an instant messaging session is typically accepted by replying to received messaging data.

Various examples or implementations of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
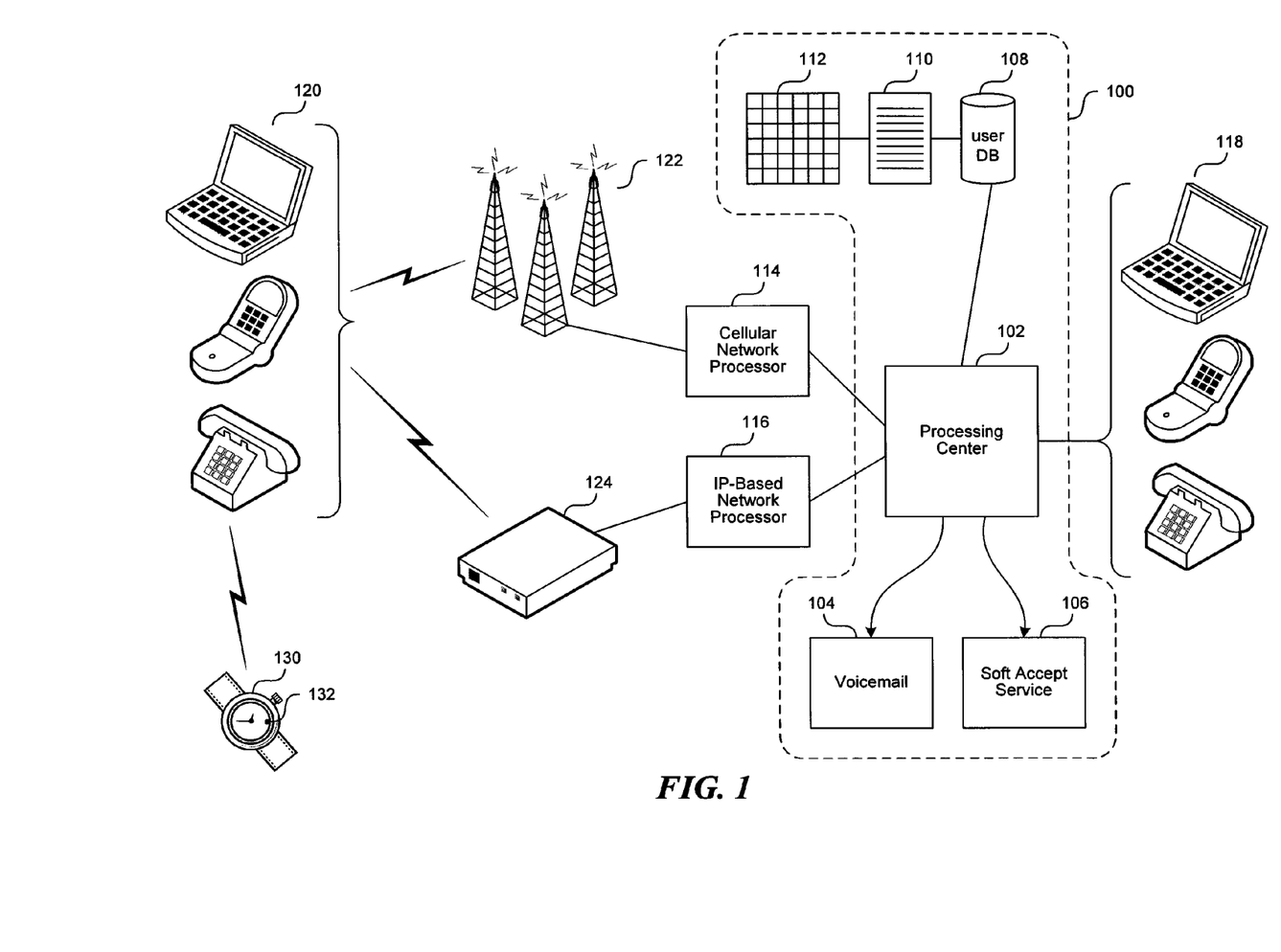
FIG. 1 illustrates a communication system in accordance with one example of the disclosed technology.

A block diagram of an example of a communication system for increasing or extending a period of time in which to accept an incoming communication is shown in FIG. 1. The system includes a telecommunications network 100. The telecommunication network 100 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The network includes a network communications processor 102 that controls the handling of communications between telecommunications devices. The network communications processor 102 is any type of network communications processor configured to receive and process communications. For example, in Global System for Mobile Telecommunications (GSM) and Unlicensed Mobile Access (UMA) embodiments, one or more Mobile Switching Centers or MSCs may be communications processors. In LTE embodiments, one or more Access Gateways (aGW) or VoIP Gateways may be communications processors. In embodiments involving instant messaging, an instant messaging server may be a communication processor. The network communications processor 102 is either a stand alone or distributed computer system. The network communications processor 102 may interact with other nodes in the telecommunications network 100, such as a separate or integrated voicemail system 104 for allowing users to record and retrieve voicemail messages and/or a soft accept service 106 for allowing originating parties to listen to, read or watch miscellaneous content while the communication is awaiting acceptance by a receiving telecommunications device 120. In addition, the network communications processor 102 provides the ability to provide audio, text and/or other announcements via the voicemail system 104 or the soft accept service 106 as will be described in further detail below. In some embodiments, voicemail system 104 or the soft accept service 106 may be enhanced with Interactive Voice Response or IVR capabilities allowing originating parties to negotiate and select among a variety of communication processing alternatives.

The telecommunications network 100 communicates with telecommunication devices 120 via one or more base station antennas 122 (in cellular embodiments), access points, terminal adapters, routers or modems 124 (in IP-based telecommunications embodiments), or combinations of the foregoing (in converged network embodiments). Although access point 124 is depicted as a standard 802.11 access point utilizing unlicensed spectrum, it will be understood that it represents all manner of access points compatible with IP-based telecommunications, including terminal adapters, routers, modems and femtocells, the latter of which are much like 802.11 access points but typically operate in a wireless carrier's licensed spectrum. Similarly, although only base stations 122 are depicted in FIG. 1, it will be understood that picocells are in-home or in-office base stations that provide more contracted coverage, but operate using a wireless carrier's licensed spectrum. Further, it will be understood that base station antennas 122, access points 124 and network communications processor 102 may communicate through one or more intervening cellular network processors 114, such as Base Station Controllers or BSCs, and/or IP-based network processors 116, such as Unlicensed Network Controllers or UNCs in UMA embodiments.

Figure 2:
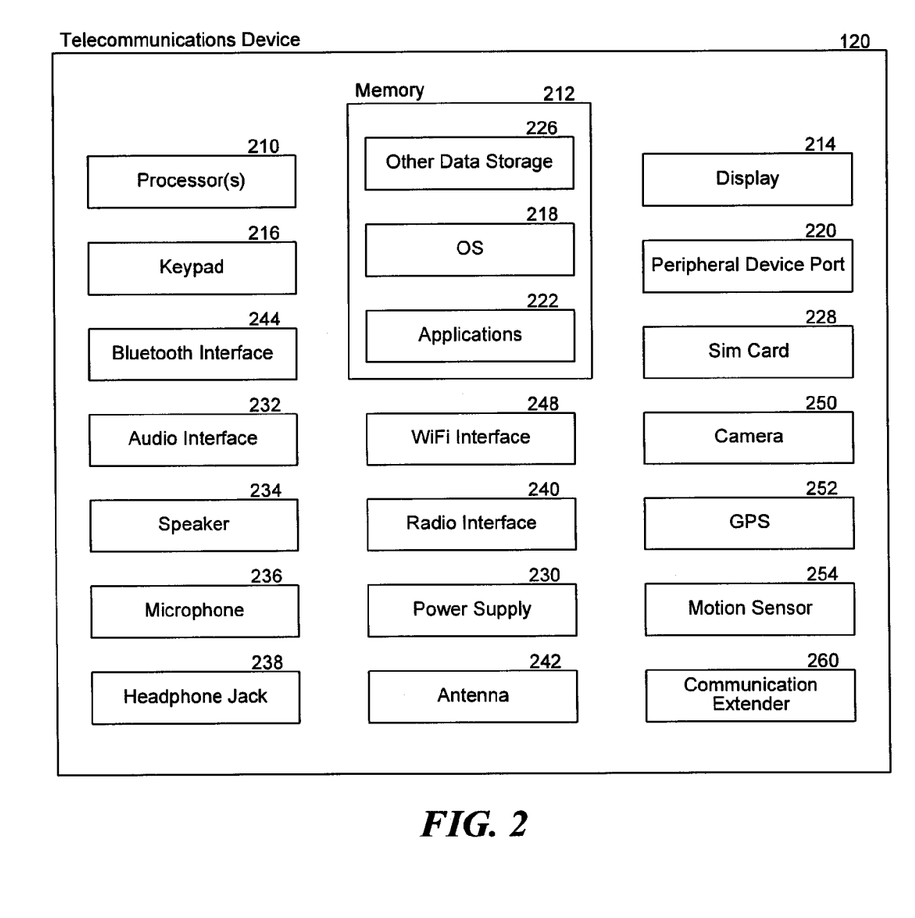
FIG. 2 illustrates an example configuration of a telecommunications device.

Referring to FIG. 2, an exemplary configuration of a telecommunications device 120 is presented. Telecommunications device 120 has one or more processors 210, a memory 212, a display 214, and a keypad 216. Memory 212 generally includes both volatile memory and non-volatile memory (e.g., RAM, ROM, Flash Memory, miniature hard drive, memory card, or the like). Telecommunications device 120 includes an operating system (OS) 218, which is resident in memory 212 and which is executed by processor 210. Keypad 216 may be a push button numeric dialing pad (such as on a typical telecommunications device), a multi-key keyboard (such as a conventional QWERTY keyboard), or one or more other types of keys or buttons, and may also include a joystick-like controller and/or designated navigation buttons, or the like. Display 214 may be a liquid crystal display, or any other type of display commonly used in telecommunications devices. For example, display 214 may be a touch-sensitive touch screen, and can then also act as an input device or keypad, such as for providing a soft-key keyboard, navigation buttons, or the like. A peripheral device port 220 may be included and may be of the type to accept additional memory cards, game cards, modem cards, or other types of peripheral devices.

One or more additional application programs 222 may be loaded into memory 212 and are run by or in conjunction with operating system (OS) 218. Examples of application programs 222 include conventional application programs, such as game programs, navigation programs, installation wizard programs, email programs, scheduling programs, PIM (personal information management) programs, word processing programs, spreadsheet programs, Internet web browser programs, and so forth. Telecommunications device 120 also includes other data storage 226 within memory 212. Other data storage 226 may be used to store information that is retained when the telecommunications device 120 is powered down. For example, applications 222 may use and store persistent information in the other data storage 226, such as messages used by an e-mail application, contact information used by a personal information manager, documents used by a word processing program, device driver programs, and the like. Additionally, in some implementations, telecommunications device 120 may include a SIM (user identity module) card 228, which is a removable memory card used to identify a user of the telecommunications device 120 to the network service provider.

Telecommunications device 120 also includes a power supply 230, which may be implemented as one or more batteries. The power supply 230 might further include an external power source, such as an AC adapter or a powered docking cradle for supplementing or recharging the batteries.

Telecommunications device 120 also includes an audio interface 232 that is coupled to a built-in speaker 234 and microphone 236. The audio interface 232 is used to provide audible messages to and receive audible messages from the user of telecommunications device 120. For example, the speaker 234 provides audible output and microphone 236 receives audible input, such as to facilitate a voice conversation. Telecommunications device 120 may include a speakerphone feature to enable telecommunications device 120 to be held away from the user's head during use, thereby facilitating simultaneous viewing of display 214. Audio interface 232 is also in communication with a headphone jack 238 to permit a wired headset including earphones and a microphone to be plugged in to telecommunications device 120 in some implementations to operate in place of built-in speaker 234 and microphone 236.

Telecommunications device 120 also includes, in wireless implementations, a radio transceiver and interface 240 that performs the function of transmitting and receiving radio frequency communications via an antenna 242. The radio interface 240 facilitates wireless connectivity between the telecommunications device 120 and various cell towers, base stations and/or access points. Transmissions to and from the radio interface 240 are conducted under control of the operating system 218. For example, communications received by the radio interface 240 may be disseminated to application programs 222 via the operating system 218, and vice versa.

Telecommunications device 120 also may include a Bluetooth® interface 244 that performs a function of transmitting and receiving Bluetooth® radio communications. For example, a peripheral device 130 may be communicate with telecommunications device 120 via Bluetooth® interface 244 for providing user inputs as set forth herein. Further, Bluetooth® interface 244 may be used for other functions, as is known in the art, such as communicating directly with nearby devices that are also Bluetooth® enabled.

Telecommunications device 120 also may include a wireless LAN (WiFi) interface 248 that performs the function of transmitting and receiving wireless communications using the IEEE 802.11 and/or 802.16 standards. For example, telecommunications device 120 can use WiFi interface 248 to communicate directly with a nearby wireless access point such as for accessing the Internet directly without having to perform the access through the network service provider's network.

Telecommunications device 120 also may include a camera 250 for taking video and still photographs using telecommunications device 120. Telecommunications device 120 also may be outfitted with a global positioning system (GPS) transponder 252 for endowing telecommunications device 120 with various GPS capabilities such as navigation, mapping, or the like. Further, telecommunications device 120 may include a motion sensor 254, such as an accelerometer for determining position, altitude and/or movement of telecommunications device 120, such as for adjusting display orientation, or the like.

Telecommunications device 120 includes either a physical or touchscreen communication availability extender interface 260 through which a user may indicate his or her desire to extend the time period of a communication's acceptance availability. The communication availability extender interface 260 may be a physical button incorporated in the housing of telecommunications device 120, or may be a multifunctional or configurable key on, for instance, a QWERTY keypad 216. In touchscreen implementations, the communication availability extender interface 260 may be presented to the user at the commencement of a communication availability period, typically accompanied by an audible alert or "ringtone" message. For example, the telecommunications device 120 may present a single softkey on a touchscreen display 214, which the user may select by physically tapping or touching the softkey. In some implementations, and as discussed further herein, the telecommunications device 120 may present multiple softkeys to the user, each softkey representing a different time period to extend a communication availability period. For example, the touchscreen display 214 may present four different softkeys representing, respectively, an additional 30 seconds, 60 seconds, 90 seconds, and 120 seconds of extended communication availability. In some implementations, communication availability extender 260 may be enabled via motion sensor 254 or microphone 236. In motion sensing implementations, a user of telecommunications device 120 may indicate his or her desire to extend a communication availability period by shaking telecommunications device 120 in a unique fashion, which motions are captured by motion sensor 254 and identified as an communication availability extension request. In microphone implementations, a user of telecommunications device 120 may indicate his or her desire for an extended communication availability period via a verbal command which, when received by microphone 236, is identified via voice recognition as an indication to extend the communication availability period.

While various components, features, and functions of a telecommunications device 120 have been described in the implementation illustrated in FIG. 2, it should be understood that numerous other configurations, components, features, and the like may be incorporated into telecommunications devices described herein, and that the implementations herein are not limited to any particular configuration for telecommunications devices.

Figure 3:
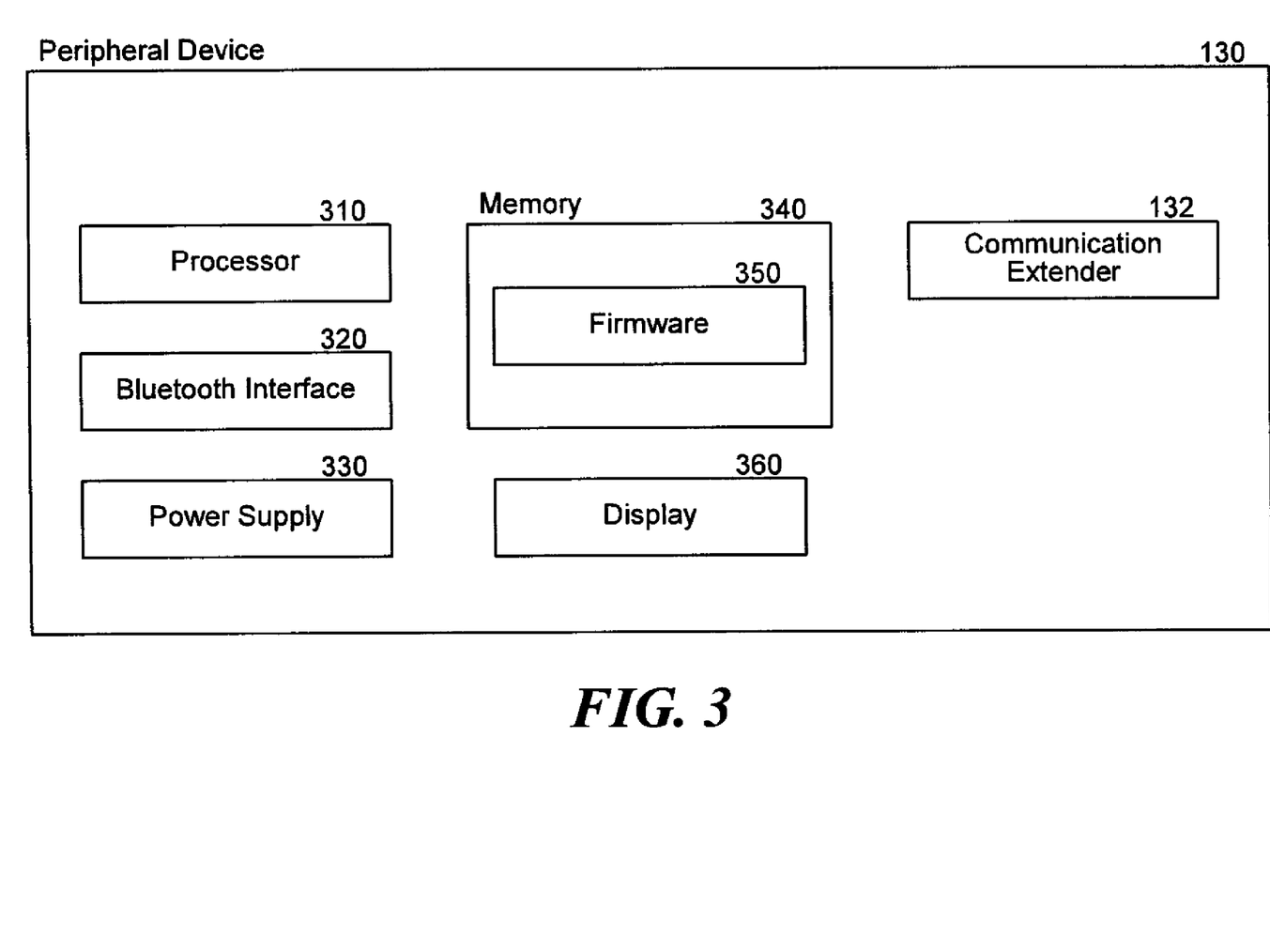
FIG. 3 illustrates an example configuration of an auxiliary device.

Referring to FIG. 3, an exemplary configuration of an auxiliary or peripheral device 130 is presented, such as a Bluetooth® device communicative with telecommunications device 120. Peripheral device 130 has one or more processors 310, a radio interface such as a Bluetooth® interface 320, a power supply 330 such as an onboard battery, onboard memory 340 containing, among other things, firmware 350.

In some implementations, peripheral device may incorporate a visual display 360. Peripheral device 130 may take a variety of form factors, such as a wristwatch, a fob, an item of jewelry, etc.

Peripheral device incorporates a physical or touchscreen communication availability extender interface 132 through which a user may indicate his or her desire to extend the time period of a communication's acceptance availability. The communication availability extender interface 132 may be a physical button incorporated in the housing of peripheral device 130, or may be a multifunctional or configurable key on peripheral device 130. In touchscreen implementations, the communication availability extender interface 132 may be presented to the user at the commencement of a communication availability period, typically accompanied by an audible alert or "ringtone" message from telecommunications device 120. For example, the peripheral device 130 may present a single softkey on a touchscreen display 360, such as a display of a digital wristwatch, which the user may select by physically tapping or touching the softkey. In some implementations, and as discuss further herein, the telecommunications device 120 may present multiple softkeys to the user, each softkey representing a different time period to extend a communication availability period. For example, the touchscreen display 360 may present four different softkeys representing, respectively, an additional 30 seconds, 60 seconds, 90 seconds, and 120 seconds of extended communication availability. In some implementations, communication availability extender interface 132 may be enabled via motion sensor or microphone. In motion sensing implementations, a user of telecommunications device 120 and peripheral device 130 may indicate his or her desire to extend a communication availability period by shaking peripheral device 130 in a unique fashion, which motions are captured by a motion sensor and identified as an communication availability extension request. In microphone implementations, a user of peripheral device 130 may indicate his or her desire for an extended communication availability period via a verbal command which, when received by a microphone, is identified via voice recognition as an indication to extend the communication availability period.

Returning to FIG. 1, upon receiving an incoming communication from any of telecommunications devices 118, the network communications processor 102 accesses a user database 108 in order to validate, identify and/or provide specific telecommunications services to network users. In GSM implementations, the network communications processor 102 may be a Mobile Switching Center or MSC (i.e., a switch) that, upon receipt of an incoming communication, accesses user information 110 stored in a user database 108, in this case a Home Location Register or HLR. In LTE implementations, the network communications processor 102 may be an Access Gateway (aGW) that, upon receipt of an incoming communication, accesses user information 110 stored in a user database 108, in this case a Home Subscriber Server or HSS. It will be understood that user database 108 may be stored in multiple databases throughout telecommunication network 100. In other implementations, the network communications processor 102 may store user information 110 internally or in one or more other networked servers or nodes. The user information 110 may include such information as one or more telephone numbers or Mobile User ISDN numbers (MSISDNs) of telecommunications devices associated with a user. For example, in GSM implementations, profile information may include MSISDNs, International User Mobile Identifiers (IMSIs) associated with a user, and a variety of service attributes (e.g., whether the user has voicemail or text messaging privileges, prepaid or postpaid services, etc.) Among the service attributes that may be stored are the time duration allowed for a communication to be accepted or "answered" by an user of telecommunications devices 120. In GSM implementations, such time duration information is included in Call Forward No Reply information that additionally contains information governing the forwarding of communications when a receiving telecommunication device 120 does not accept a communication within the designated acceptance duration.

In the communication system shown, a telecommunications device 118 associated with an originating party initiates a communication to a telecommunications device 120 associated with a receiving party. In one implementation, the telecommunications devices 118, 120 may be mobile or cellular telephones, but it will be understood that telecommunications devices 118, 120 may include any type of device featuring telecommunications capabilities, such as landline phones, VoIP phones, smart phones, personal digital assistants (PDAs), laptop or desktop computers, netbooks, media players such as the Apple IPOD® device, reader devices such as the Amazon KINDLE™ device, or other peripherals or devices adapted to transmit and receive communication messages over the telecommunications network 100.

In the example shown, the originating party's telecommunications device 118 initiates a communication to the receiving party's telecommunications device 120. Upon receipt of the communication from telecommunications device 118, the network communications processor 102 polls the user database 108 to access profile information 110 for validation and routing purposes, as well as to determine whether the call must be handled in accordance with other attributes. Among these attributes may be one or more communication availability extension attributes 112. The communication availability extension attribute(s) 112 may be one or more default attributes established by telecommunications network 100, one or more specific duration attributes established by the receiving party, or a combination of these. The communication availability extension attribute(s) 112 may be of varying values. For example, the receiving party may establish a different communication availability extension attribute for different times of day such as, for example, establishing a communication extension period of 120 seconds during early morning and late evening hours, but a communication extension period of 60 seconds for business hours. The communication availability extension attributes 112 may be also, for example, be of various values dependent upon an identifier associated with an originating party's telecommunications device 118. For example, the receiving party may establish a communication availability extension period of 120 seconds for all identifiers associated with a spouse's originating telecommunications device 118 and her children's telecommunications devices 118, but also establish a default communication availability extension attribute of 60 seconds for all other telecommunications devices 118.

After retrieving the user information 110, including the call availability extension attributes 112, the network call processor transmits a message to the telecommunications device 120 that alerts the telecommunications device 120 to the availability of an incoming communication, and causes the telecommunications device 120, upon receipt of the message, to commence an alert or "ringing" cycle. The message may consist of an SS7 signal, a SIP signal, or other type of message. SS7 or Signaling Session #7 is a set of telephony signaling protocols used to set up public switched telephone network telephone calls. SIP or Session Initiation Protocol is a signaling protocol widely used for setting up and tearing down multimedia communication sessions such as voice and video calls over the Internet. Such signaling is well known in the art and will not be discussed in detail here.

It will be understood that many telecommunications carriers provide alternate or additional "ringback" services to their users which enable unique audio playback to originating or calling parties during the traditional duration of a "ringing" cycle, essentially by replacing traditional audio with musical performances, spoken word performances, announcements, etc. Telecommunications carriers provide ringback services by incorporating ringback platforms or nodes into their telecommunications network (not shown). In one example, upon polling user profile 110 to determine communication availability and communication availability extension attributes 112 associated with a receiving party's telecommunications device 120, the network communications processor 102 may additionally identify a ringback service attribute requiring telecommunications network 100 to provide a ringback service to the originating party. The attribute will contain specific call routing information instructing the network communications processor 102 to temporarily connect or deflect the incoming communication to the ringback/announcement services node such that the originating party's telecommunications device 118 receives an audio track (e.g., music, spoken word, etc.). At the same time, the network communications processor 102 transmits a communication availability message to the receiving telecommunications device 120 as discussed below. If the receiving telecommunications device 120 accepts the incoming communication, the network communications processor 102 deflects the incoming communication from the ringback platform or node to the telecommunications device 120.

In either traditional call handling or call handling incorporating a ringback service, the network communication processor offers the incoming communication to the receiving telecommunications device 120, in accordance with information stored in the profile information 110. Substantially concurrent with dispatch of a communication availability message to the receiving telecommunications device 120, the network communications processor 102 utilizes a timer function and waits for a predetermined length of time which, if the receiving telecommunications device 120 has failed to accept the communication, transmits a second message to the telecommunications device 120 that terminates the ability of the telecommunications device 120 to accept the incoming communication. After the predetermined length of time, the network communications processor 102 performs additional steps, which may include forwarding the communication to a voicemail system 104 or initiating the transmission of a message to the originating party that indicates the receiving party is currently unavailable.

As discussed above, there are many instances in which a receiving party of telecommunications device 120 would desire some additional time to accept a communication. In accordance with one implementation of the disclosed technology, a processor within the receiving party's telecommunications device 120 is programmed to cause telecommunications device 120 to selectively transmit a message to the network communications processor 102 indicating that the user has requested additional time to accept the communication. In one implementation, the telecommunications device 120 includes a control such as a physical button or a switch 260 on the telecommunications device 120, or a software-defined button or control displayed on a telecommunication device's touch-sensitive screen that can be selected by the user as an indication that the user desires additional time to accept the communication. In an alternative implementation, the telecommunications device 120 may detect that a user has requested additional time to accept a communication based on voice recognition of audio messages applied to an audio sensor, e.g., a microphone 236. Alternatively, the processor 210 in the telecommunications device 120 may be programmed to detect a pattern of signals produced by an accelerometer or other motion sensor 254. For example, the processor 210 in the telecommunications device 120 can be programmed to detect when the user has performed some action such as patting the telecommunications device 120 for a predetermined number of times in a specific rhythmic pattern to indicate that additional time is requested to accept the communication. In yet another implementation, a light sensor (not shown) that is associated with a camera in the telecommunications device 120 can be used to detect when additional time to accept is requested. For example, if the telecommunications device 120 is in a jacket pocket or buried in a purse, the light sensor can detect that it is in a dark environment and, if so, upon the receipt of a communication availability message, be used by the processor to determine when to request additional time to accept a communication. In such implementations, the telecommunications device 120 is configured to automatically request extension of a communication availability period without user input.

Upon detection that the receiving party has indicated via communication availability extension interface 260, interface 132 (in peripheral device implementations), or upon detecting a condition such as an absence of light as discussed above, the processor 210 in a telecommunications device 120 causes the telecommunications device 120 to transmit a message to the network communications processor 102 indicating that additional time to accept the communication is requested. The network communications processor 102 receives the message from the telecommunications device 120, identifies it as a request for additional time, and processes the communication to provide additional time to accept the communication in accordance with an additional time duration or a specific additional time duration attribute consistent with the communication availability extension attributes 112.

Continuing to refer to FIG. 1, in yet another implementation, the telecommunications device 120 is adapted to communicate with an auxiliary device 130 separate or separable from the telecommunications device 120, having a control 132 that a user can activate to request additional time to accept an incoming communication. The auxiliary device 130 may be a hands-free headset, jewelry (e.g., a watch, ring, bracelet, or pin), or other device that is readily accessible to the user. The control 132 communicates with the telecommunications device 120 via a low power, short range communication protocol, such as a Bluetooth® wireless communication link. Upon detection of a user pressing the control 132, a message is transmitted from the peripheral device 130 to the telecommunications device 120 indicating that the user requests additional time to accept the incoming communication. Upon receipt of the message from the auxiliary device, the telecommunications device 120 transmits a message to the network communications processor 102 indicating that the receiving party has requested additional time to accept the incoming communication.

In yet another alternative implementation, the control 132 of the auxiliary device 130 may be selectively hard wired to the telecommunications device 120. For example, the telecommunications device 120 may be placed in a cradle in an automobile and the control 132 found on the dashboard, steering wheel, or other convenient location and hard wired to the cradle.

Upon receipt of the message requesting additional time to accept the incoming communication from the telecommunications device 120, the network communications processor 102 recognizes the received message as a request for extended time to accept the incoming communication. In some implementations, if network communications processor 102 has not already received the communication availability extension attributes 112 from user database 108, it may poll the user database 108 to identify a communication availability extension attribute to apply to the communication. As discussed above, the communication availability extension attribute may be a default time period established by the network or it may be a specific time period established by the receiving party. The network communications processor 102 then adjusts the relevant timer parameters, such as by resetting and restarting the timer to run for a duration associated with the communication availability extension attribute, or by simply adding the additional time associated with the communication availability extension attribute to the currently-pending time period such that the timer runs for the initial default time period and then for the extended time period. If the receiving party does not accept the communication within the extended communication availability period, the network communications processor 102 then processes the communication in accordance with steps normally taken when the receiving party does not accept a communication in the usual unextended time period.

In another implementation, the network communications processor receives the communication availability extension attribute(s) 112 during the initial polling of the customer profile 110 and holds the attribute in memory. Upon recognizing a received message from telecommunications device 120 as a request for extended time to accept an incoming communication, the network communications processor 102 retrieves the communication availability extension attribute(s) 112 from memory and proceeds to extend the communication availability accordingly, either by resetting and restarting the timer to run for the period of time associated with the relevant communication availability extension attribute 112, or by simply adding a time period associated with the relevant communication availability extension attribute 112 to the end of the currently-pending communication availability period.

In another implementation, one or more communication availability extension attributes may be associated with one or more identifiers associated with an originating party's telecommunications device 118. For example, the user profile 110 may include a table identifying specific phone numbers or other identifiers associated with originating telecommunications devices 118 and cross referencing to communication availability extension attributes 112. A receiving party may therefore, via a Web interface, telecommunications device interface, or other interface, establish unique communication availability extension attributes 112 relating to specific originating parties. Thus, if an originating party using telecommunications device 118 with a MSISDN associated with an communication availability extension attribute of "120 seconds" initiates an incoming communication, the receiving party may extend his or her ability to accept the incoming communication to 120 seconds, or by an additional 120 seconds, by initiating a communication extension.

In another implementation, the network communications processor 102 is configured to extend a communication availability period based upon the type of received message from telecommunications device 120, regardless of whether the network communications processor 102 has received communication availability extension attributes 112 from user database 108. For example, network communications processor 102 may be configured to identify a variety of different types of messages received from telecommunications device 120, each of which instructs network communications processor 102 to extend the communication availability period by, for example, 30, 60, 90, or 120 seconds. Upon receiving such unique message, the network communications processor 102 identifies the received message and associates it with a specific communication extension value, and then resets and restarts the timer to run for an associated extended time period, or simply adds the relevant extended time period to the currently-pending period. In one implementation, the network communications processor is configured to extend the communications availability period in conformance with the communication availability extension message received from telecommunications device 120 in lieu of the communications availability extension attribute 112, thereby allowing the user of telecommunications device 120 to supersede the received communication availability extension attribute 112.

In another implementation, the telecommunications device 120 is configured to, upon or after receiving a message alerting it to the availability of an incoming communication, accept multiple user inputs which permit the user to designate one of several time durations by which to extend the call availability period. Such multiple user inputs may consist of depressing a physical interface 260 one or more times, the number of which correlate to a specific call availability duration extension. For instance, if a receiving party depresses the button once, the call availability period may be extended 30 seconds; if twice, the call availability period may be extended 60 seconds; etc. In another implementation, the telecommunications device 120 may present a user interface to a receiving party upon or after receiving a message alerting it to the availability of an incoming communication. For example, if the telecommunications device 120 incorporates a touchscreen, the telecommunication device 120 may present an assortment of icons on the touchscreen, each representing an additional amount of time that a communication availability period may be extended, if tapped by the user. The telecommunications device 120 is configured to transmit a message specific to a communication availability extension period to the network communications processor 102.

Similarly, in another implementation, the peripheral device 130 is configured to accept multiple user inputs which permit the user to designate one of several time durations by which to extend the call availability period. Such multiple user inputs may consist of depressing a physical interface 132 one or more times, the number of which correlate to a specific call availability duration extension. For instance, if a receiving party depresses the button once, the call availability period may be extended 30 seconds; if twice, the call availability period may be extended 60 seconds; etc. In another implementation, the peripheral device 130 may present a user interface to a receiving party upon or after receiving a message alerting it to the availability of an incoming communication. For example, if the peripheral device 130 incorporates a touchscreen, the peripheral device 130 may present an assortment of icons on the touchscreen, each representing an additional amount of time that a communication availability period may be extended, if tapped by the user. The peripheral device 130 is configured to transmit a message specific to the communication availability extension attribute selected to the telecommunications device 120, which in turn passes the message on to the network communications processor 102 or otherwise translates the received message from peripheral device 130 into a corresponding message to network communications processor 102.

In another implementation, after receipt of a message indicating that additional time to accept the incoming communication and after polling the profile database 110 for the extended communication availability attribute(s) 112, the network communications processor 102 may connect or deflect the incoming communication to a soft accept service 106. A soft accept service may be any type of service to which an incoming communication is connected or deflected, and incorporates, for instance, an interactive voice response or IVR unit or node, or other player or server in which a originating party can, for example, hear an announcement that the receiving party has requested an extended period of time to accept the communication. For non-audio communications, such as those involving instant messaging, the soft accept service may provide text announcements to the originating party. In either case, the message transmitted to the originating party may indicate that he or she may exit to, for example, voicemail or initiate an SMS, at any time. Upon receiving a message from a telecommunications device 120 instructing the network communications processor 102 to extend the call availability period, the network communications processor 102 transfers and connects the call to a soft accept service node 106. The soft accept service node 106 receives the incoming communication and may provide a default message or announcement to the originating telecommunications device 118. For instance, the soft accept service node 106 may play an audio announcement stating: "The party you have dialed has indicated they are busy, but wants to talk to you—please continue to hold"; or, "The party you have dialed needs a moment to answer your call—please continue to hold." The soft accept service node 106 may repeat the announcement, play music or other recordings, or provide other announcements. If the receiving party accepts the communication within the communication availability period, the network communications processor 102 deflects the incoming communication from the soft accept service node 106 to telecommunications device 120. It will be understood that soft accept services as described above may be incorporated into a voicemail platform 104 or may utilize existing ringback platforms.

Figure 4A:
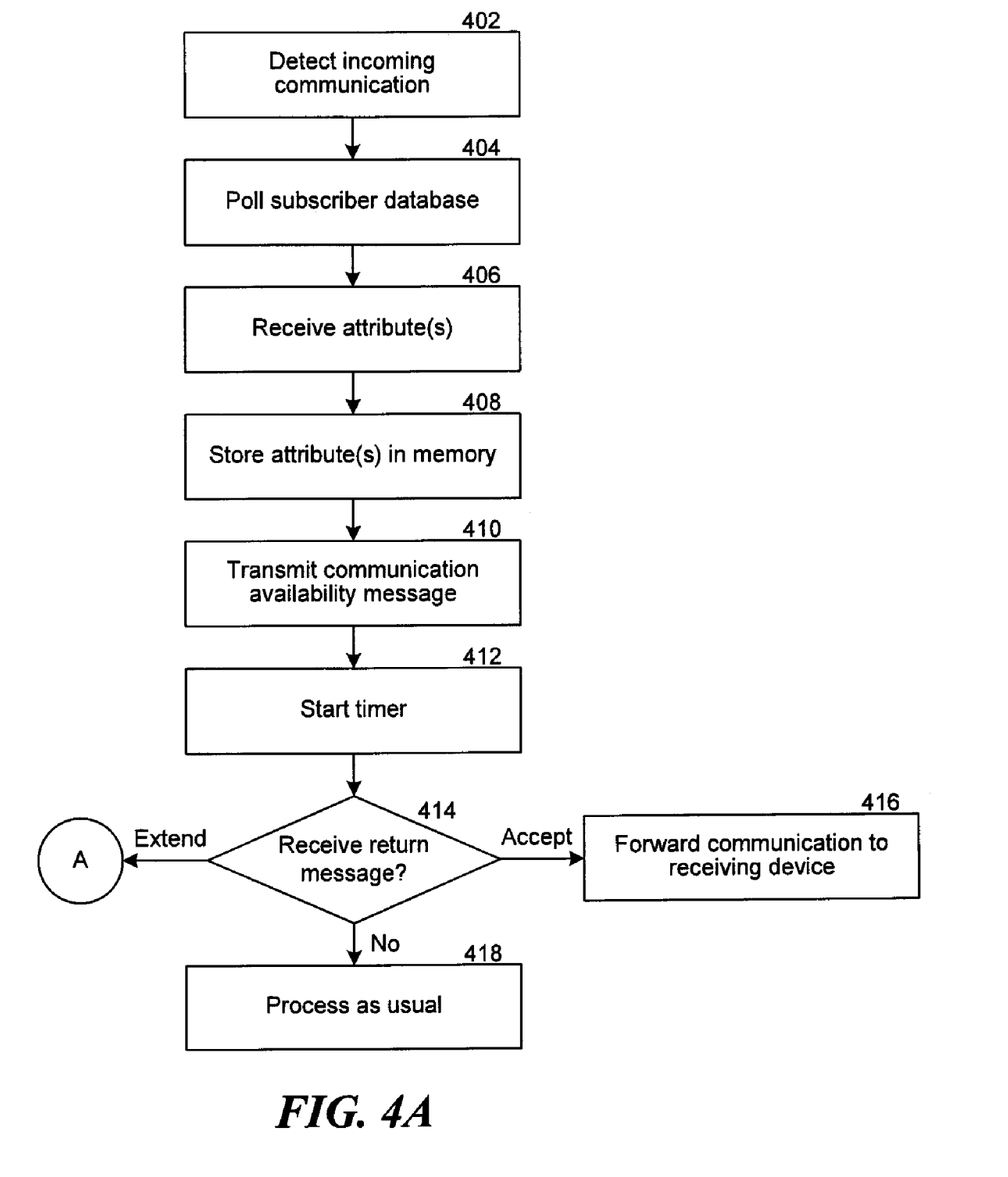
FIGS. 4A and 4B are flow charts illustrating steps performed by a communications processor of a telecommunications network to increase a time allowed to accept an incoming communication in accordance with an example of the disclosed technology.
Figure 4B:
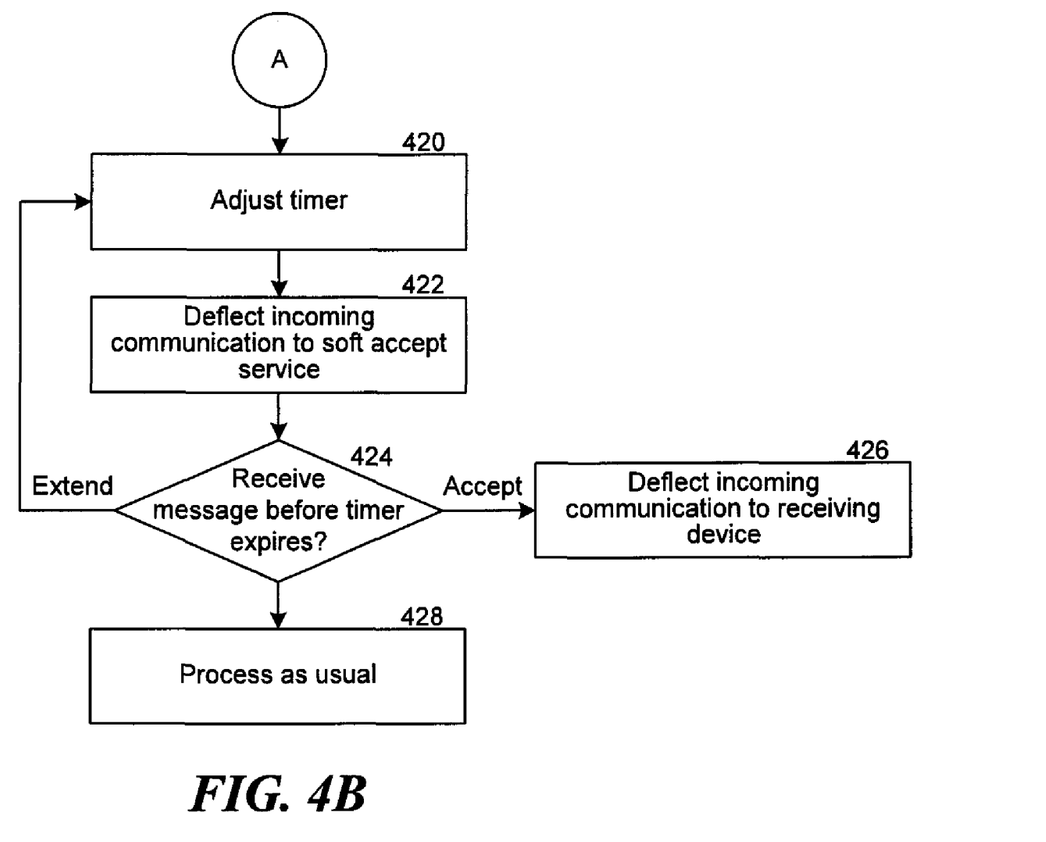

FIGS. 4A and 4B illustrate an algorithm or a series of steps performed by the network communications processor for processing a communication with an increased time to accept. At 402, a communications processor detects an incoming communication to a receiving party's telecommunication device 120. At 404, the network communications processor 102 polls a user database 108 to obtain user service attributes 110 including communication extension attributes 112. The obtained communication extension attributes 112 may be a default communication availability attribute, an attribute established by the user, an attribute specific to the calling MSISDN or other identifier as established by the user, or a subset or all of the communication availability attributes regardless of the originating party's MSISDN or other identifier. At 406, the communications processor receives the communication availability extension attribute(s) from the user database 108 and, at 408, stores such attributes in memory. At 410, the network communications processor 102 transmits a communication availability message to the receiving telecommunications device 120. At 412, the communications processor additionally triggers or starts a timer consistent with the received communication availability attribute. If the communications processor has received a single communication availability attribute from user database 108, then the attribute determines the length of time that the communications processor will allow to a receiving telecommunications device 120 to accept a communication. In some implementations, the communications processor may identify the relevant communication availability attribute based upon one or more identifiers received from the originating party's telecommunications device 118, such as a phone number, IP address, or other identifier.

At 414, the communications processor determines if it has received a message from the receiving telecommunications device 120. If it has received an "ACCEPT" message from receiving telecommunications device 120, then it will proceed to connect or deflect the communication to the receiving telecommunications device 120. If it has received no message from the receiving telecommunications device 120 and the communications availability period has expired, then network communications processor 102 will process the communication as usual, such as by passing a voice communication to voicemail 104. The communications processor may receive an "EXTEND" message from the receiving telecommunications device 120, in which it will reset the communication availability timer at 420. The received "EXTEND" message may be a network default message which the communications processor 102 identifies as an instruction to extend the communication availability period. In some implementations, receipt of the "EXTEND" message causes the communications processor to identify a new communication availability attribute that is either a network default attribute, a communication availability extension attribute 112 established by the user, or an attribute associated with an identifier (e.g., a telephone number) associated with the originating party. In some implementations, the received "EXTEND" message may be one of multiple "EXTEND" messages, each of which corresponds to a different communication availability period (e.g., 30 seconds; 60 seconds; 90 seconds; etc.). The communications processor identifies the received message, identifies the communications availability period associated with the received message, and adjusts the communication availability timer accordingly at 420.

In some implementations, the network communications processor 102 may connect the incoming communication to a soft accept server 106. The soft accept server 106 may be a separate node within a telecommunications network 100 or may be incorporated into an existing node, such as a voicemail node 104. The soft accept server provides an announcement or other message to the originating party's telecommunication device 118.

At 424, the network communications processor 102 determines whether it has received a message from receiving telecommunications device 120. If network communications processor 102 has received an "ACCEPT" message, it then connects or deflects the incoming communication to receiving telecommunications device 120. In some implementations, it deflects the incoming communication from soft accept server 106 to receiving telecommunications device 120. If network communications processor 102 has received no message from telecommunications device 120, then it handles the incoming communication as usual, such as deflecting or forwarding such communication to voicemail 104. If the network communications processor 102 has received an "EXTEND" message from receiving telecommunications device 120, then it performs the steps described with respect to 420 above.

Figure 5:
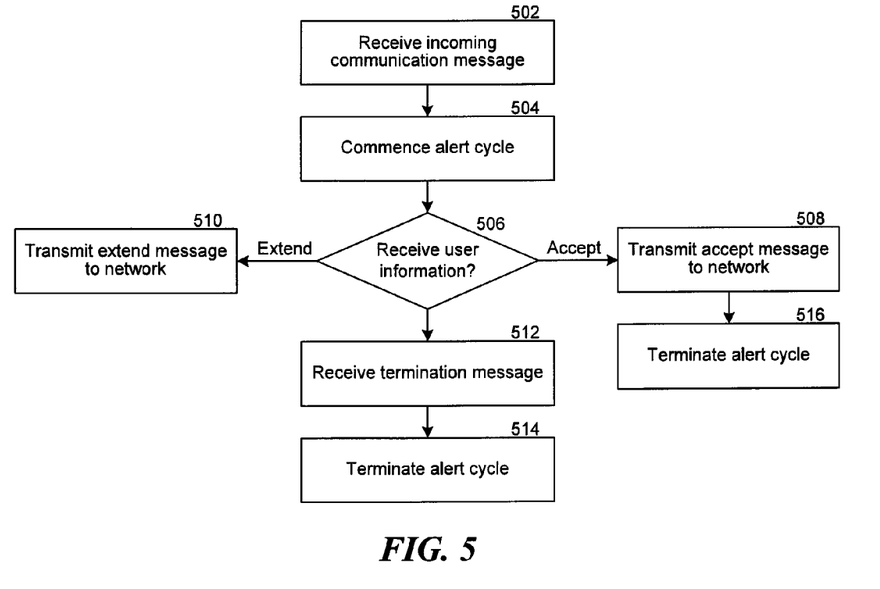
FIG. 5 is a flow chart illustrating steps performed by a telecommunications device to request additional time to accept an incoming communication in accordance with an example of the disclosed technology.

FIG. 5 illustrates a series of steps performed by a receiving telecommunications device to process to extend a communication acceptance period. At 502, the receiving telecommunications device receives a message alerting it to the availability of an incoming communication. As mentioned above, the message may consist of a SS7 signal, a SIP signal, or any other type of message that alerts the receiving telecommunications device to the availability of an incoming communication. In response to the receipt of the message, the receiving telecommunications device, at 504, commences an alert cycle, such as a ringtone cycle, to alert the user to the availability of an incoming communication.

At 506, the receiving telecommunications device determines whether it has received an indication from a user. The indication may be provided in a variety of ways including, for example, pressing a designated physical button, tapping a button displayed on a touchscreen interface, via voice interaction in which a spoken direction from the user is converted via voice recognition into an indication, detection of a motion made with the device via accelerometers which is translated into an indication, etc. The indication may also be provided via a peripheral device, such as a Bluetooth device, which is paired with or otherwise communicates with receiving telecommunications device 120. If the user provides an indication to "ACCEPT" the incoming communication, the receiving telecommunication device transmits a message to the communications processor to connect or forward the incoming communication. If the user provides no indication, the receiving telecommunications device will continue in a ringtone or alert cycle until such time as it receives a termination message from the communications processor at 512, following which it will terminate the user alert/ringtone cycle at 514. If the user provides an indication to "EXTEND", then the receiving telecommunications device will, at 510, transmit a message associated with extending a communication availability period, to the communications processor.

In some implementations, the receiving telecommunications processor may be configured to transmit any of multiple "EXTEND" messages at 510, each associated with a different period of time by which to extend a communication availability period. For example, upon receiving an incoming communication availability message, the receiving telecommunications device may be configured to, in addition to commencing an alert/ringtone cycle, accept user indications associated with extended communication availability periods for varying time periods. For example, the receiving telecommunication device may be configured to transmit messages associated with extending a communication availability period by, respectively, 30 seconds, 60 seconds, 90 seconds, etc., depending on a sequence of presses on a designated button. For example, a single press on a designated button on a receiving telecommunications device or an associated peripheral device (e.g., a Bluetooth device) may be associated with a 30 second extension; two successive presses may be associated with a 60 second extension; three successive presses may be associated with a 90 second extension; etc. In another implementation, a receiving telecommunications device may present, coincidentally with receiving an incoming communication message at 502, a user interface on a touchscreen display presenting objects which are associated with variable extension periods. For example, the user interface may present objects associated with 30 seconds, 60 seconds, 90 seconds, etc., and which, when tapped by a user, result in transmission of a message associated with the selected communication availability extension period at 510.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

We claim:

1. A method implemented in a telecommunications network, the method comprising:
    receiving an incoming call from an originating telecommunications device for connection to a receiving telecommunications device;
    polling a customer database for profile attributes associated with the receiving telecommunications device, wherein the profile attributes comprise at least a user-adjustable call availability duration attribute;
    receiving the profile attributes;
    storing the profile attributes in memory;
    transmitting a call availability message to the receiving telecommunications device;
    starting a call availability timer to run for a period of time consistent with the call availability duration attribute;
    receiving an extended availability request message from the receiving telecommunications device that is indicative of the receiving party's desire for an increased time to accept the incoming call; and
    adjusting the call availability timer to run for an additional period of time.

2. The method of claim 1, wherein the customer database is a Home Location Register.

3. The method of claim 1, wherein the customer database is a Home Subscriber Server.

4. The method of claim 1, wherein the user-adjustable call availability duration attribute is a default attribute.

5. The method of claim 1, wherein the user-adjustable call availability duration attribute is a user-adjusted attribute.

6. The method of claim 1, wherein the call availability message and the extended availability request message are SS7 signals or SIP signals.

7. The method of claim 1, wherein the user-adjustable availability request message is one of multiple user-adjustable availability request messages associated with a unique extension attribute.

8. The method of claim 7, wherein the additional period of time is associated with the user-adjustable call availability duration attribute.

9. The method of claim 1, further comprising:
    deflecting the incoming call to a soft answer server.

10. The method of claim 1, wherein adjusting the call availability timer comprises resetting and restarting the call availability timer.

11. The method of claim 1, wherein adjusting the call availability timer comprises adding the additional time period to the call availability timer.

12. A method implemented by a communications processor in a telecommunications network, comprising:
    receiving an incoming communication from an originating telecommunications device associated with an originating device identifier and a terminating device identifier;
    querying a customer database for profile attributes associated with a terminating device identifier, wherein a subset of the profile attributes include at least an originating device communication availability duration attribute and at least one originating device extended communication availability duration attribute associated with the originating device identifier;
    receiving the profile attributes including the subset of the profile attributes that include at least the originating device communication availability duration attribute and the at least one originating device extended communication availability duration attribute;

storing in memory the originating device communication availability duration attribute and the at least one originating device extended communication duration attribute;

transmitting a communication availability message to the terminating telecommunications device;

starting a communication availability timer to run for a period of time consistent with the at least one originating device communication availability duration attribute;

receiving an extended availability request message from the terminating telecommunications device that is indicative of the receiving party's desire for an increased time to accept the incoming communication, wherein the message is received before the expiration of the timer; and adjusting the communication availability timer to run for an additional period of time consistent with the at least one originating device extended communication availability duration attribute.

13. The method of claim 12, wherein the originating device extended call availability duration attribute comprises multiple originating device communication availability duration attributes associated with context attributes, respectively, and further comprising:

identifying current context information;

identifying one of the plurality of originating device communication attributes based upon a correlation of the associated context attribute with the current context information.

14. The method of claim 12, wherein adjusting the call availability timer comprises resetting and restarting the call availability timer.

15. The method of claim 14, wherein the context attribute comprises temporal information, and the current context information comprises current temporal information.

16. The method of claim 12, wherein adjusting the call availability timer comprises adding an additional time period to the call availability timer.

17. A system implemented in a telecommunications network, the system comprising:

means for receiving a stored profile of one or more attributes in response to receiving an incoming call from an originating telecommunications device for connection to a receiving telecommunications device, wherein the stored profile is associated with the receiving telecommunications device, and wherein the profile attribute comprises at least a user-adjustable call availability duration attribute; and, means for adjusting a call availability timer based on the user-adjustable call availability duration attribute.

18. The system of claim 17, further comprising:

means for receiving an extended availability request message from the receiving telecommunications device that is indicative of the receiving party's desire for an increased time to accept the incoming call; and means for adjusting the call availability timer to run for an additional period of time.

19. The system of claim 17, wherein the means for receiving includes means for storing the profile attribute in memory after receiving the incoming call and after receiving the stored profile.

20. A telecommunications device configured to communicate with a communication processor of a telecommunications network in order to receive communications, wherein the telecommunications device is configured to communicate with an auxiliary device, the telecommunications device including a processor that is programmed to:

provide an alert of an incoming communication upon receipt of a message from the communication processor, wherein the telecommunications network has associated therewith a predetermined time to accept incoming communications directed to telecommunications devices in communication with the telecommunications network;

detect an input that a receiving party desires increased time before accepting the incoming communication, wherein the input is detected before expiration of the predetermined time to accept the incoming communication; and transmit a message to the communication processor indicating that the receiving party desires increased time to accept the incoming communication, and wherein the processor is further programmed to detect the input by receiving a message transmitted from the auxiliary device.

21. The telecommunications device of claim 20, wherein the input is detected upon detection of the receiving party activating a control on the telecommunications device, and wherein the input is detected after the receiving party is first alerted to the incoming communication.

22. The telecommunications device of claim 20, wherein the auxiliary device is configured as a piece of jewelry.

23. The telecommunications device of claim 20, wherein the auxiliary device is a hands free headset.

24. The telecommunications device of claim 20, wherein the processor is programmed to detect the input by detecting a message produced by a sensor within the telecommunications device.

25. The telecommunications device of claim 24, wherein the sensor is an accelerometer.

26. The telecommunications device of claim 24, wherein the sensor is a light sensor.

27. The telecommunications device of claim 24, wherein the sensor is an audio sensor.

28. The telecommunications device of claim 20, wherein the processor is programmed to produce the input by comparing an identifier of an originating party to an identifier for which the receiving party has previously indicated a desire for an increase in time to accept a communication.

29. A telecommunications system configured to communicate with a communication processor of a mobile telecommunications network in order to receive communications, the telecommunications system including:

a communication device having a processor that is programmed to:

alert a receiving party of an incoming communication upon receipt of a message from the communication processor, wherein the mobile telecommunications network has associated therewith a predetermined time to accept incoming communications directed to mobile telecommunications devices;

detect an input that the receiving party desires increased time to accept the incoming communication, wherein the input is detected after the receiving party is first alerted to the incoming communication and before expiration of the predetermined time allowed to accept the incoming communication; and transmit a message to the communication processor indicating that the receiving party desires increased time to accept the incoming communication; and an auxiliary device, associated with the communications device, that produces the input that the receiving party desires increased time to accept the incoming communication.

30. A device for signaling a telecommunications device of a receiving party, wherein the telecommunications device is configured to communicate with a telecommunications network, the device comprising:
- a control that is configured to be activated by a receiving party when the receiving party desires increased time to accept an incoming communication at the telecommunications device, wherein the increased time is greater than a default time for accepting incoming communications from the telecommunications network; and
- a communication circuit that is configured to signal the telecommunications device when the receiving party has activated the control, and wherein the device is incorporated into a piece of jewellery.

31. The device of claim 30, wherein the device is incorporated into a hands free headset.

32. The device of claim 30, wherein the communication circuit includes a Bluetooth™ communication circuit.

33. A computer-readable storage medium that has a sequence of programmed instructions that when executed by a processor in a telecommunications device cause the processor in the telecommunications device to perform a method to receive communications by:
- providing an alert of an incoming communication upon receipt of a message from the communication processor, wherein the telecommunications network has associated therewith a predetermined time to accept incoming communications directed to telecommunications devices in communication with the telecommunications network;
- detecting an input that a receiving party desires increased time before accepting the incoming communication,
  - wherein the input is detected before expiration of the predetermined time to accept the incoming communication and
  - wherein the input was produced by comparing an identifier of an originating party to an identifier for which the receiving party has previously indicated a desire for an increase in time to accept a communication; and
- transmitting a message to the communication processor indicating that the receiving party desires increased time to accept the incoming communication.

* * * * *